April 23, 1968 G. T. DUNDERDALE 3,378,889
LOAD-BRACING HINGE STRUCTURE
Filed May 11, 1967
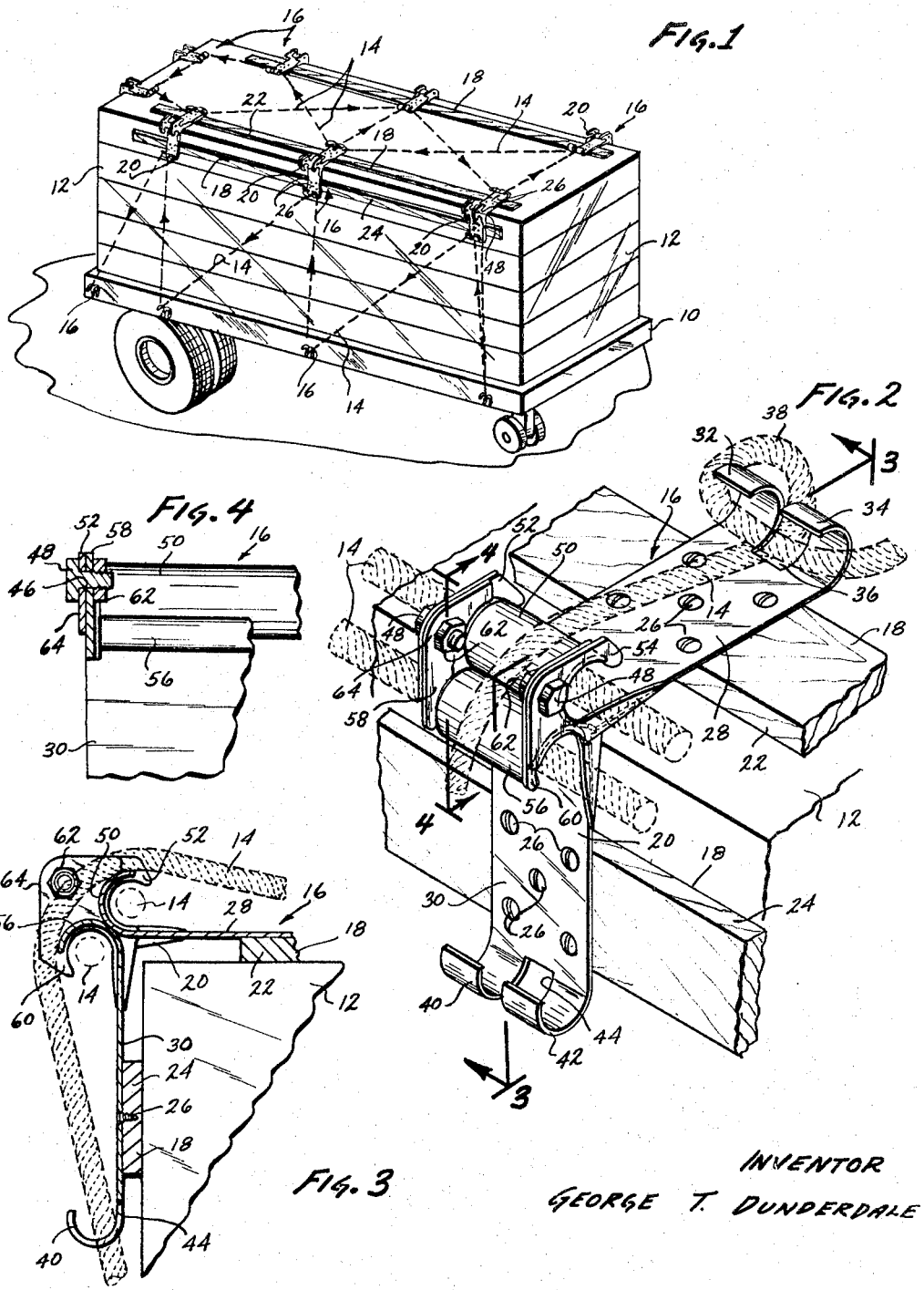
INVENTOR
GEORGE T. DUNDERDALE
BY Nilsson, Robbins & Anderson
ATTORNEYS United States Patent Office 3,378,889
Patented Apr. 23, 1968

3,378,889
LOAD-BRACING HINGE STRUCTURE
George T. Dunderdale, 23045 Hatteras,
Woodland Hills, Calif. 91364
Filed May 11, 1967, Ser. No. 637,659
8 Claims. (Cl. 24—16)

ABSTRACT OF THE DISCLOSURE

A structure for use on loads in transit for bracing a corner of the load and engagingly receiving tie lines for holding the load. A hinged structure includes two hinge plates pivotally connected at one end and incorporating integral hook sections at the other ends for receiving tie lines. The pivotal joint is formed by upward side extensions of each hinge plate held together by bolts and defining a space or detent therebetween for receiving a tie line. Adjacent the pivotal mount the hinge plates are turned back to afford a curved surface of relatively high radius affording better engagement with a tie line. A plurality of the hinge structures are affixed between two elongate slats to provide an elongate corner brace.

Background of the invention

For purposes of consideration herein, the trucks or vehicles that carry the tremendous quantity of freight on highways may be divided into two distinct classes. These vehicles either incorporate a closed or an open bed. In general, the open bed, comprising simply a flat rack is more flexible in accommodating various loads and is considerably less expensive to manufacture. Furthermore, the open truck affords access to the entire load which is frequently a distinct advantage. However, in spite of these considerations, closed-bed trucks are considerably more popular by reason of the positive support afforded to the load in transit.

In the past, it has been customary to load an open or flat rack truck, as for example with lumber, then employ tie lines to secure the load in position. Of course, the tie lines are anchored to the truck bed and furthermore various prior structures have been proposed for use in association with the tie lines with the objective of making the load more secure. Specifically, for example, various forms of corner braces have been utilized at the upper corners of a load for purposes of defining and maintaining the corner and to engage the tie lines. However, in general, such devices have generally been less than completely satisfactory with the result that a substantial number of loads have continued to fall from trucks resulting in the continuing unpopularity of open-bed vehicles.

The various specific forms of corner-supporting devices employed in the past to brace loads in transit have had various drawbacks. Specifically, for example, some of these structures have not afforded any positive engagement with tie lines. Other units have had a tendency to slip out of position leaving the load corner undefined. Still others have had a tendency to cut tie lines by reason of sharp edges unavoidable in the design. Pertinent to the consideration of various prior corner-mount structures have been the problems of manufacturing costs and ease of use. With respect to the better units, manufacturing costs have been rather high in view of the relatively limited life expectancy that can be anticipated. Therefore, in view of these various considerations, a considerable need exists for an improved bracing hinge structure for use in cooperation with tie lines to define corners and support a load of freight in transit.

Summary of the invention

The load-bracing hinge structure hereof may be employed to afford a corner to a load of freight when incorporated with a network or lacing of tie lines, the combination of which will provide rigid support for the freight load. The basic hinge structure includes two hinge plates pivotally joined and having exterior ends turned back to afford integral hook sections for receiving tie lines. Each of the hook sections may be separated by a detent or open channel, again to accommodate the passage of a tie line. The mating ends of the hinge plates incorporate an improved pivotal junction. In this regard, rod-hinge apparatus is avoided to a considerable advantage as such structure is expensive to manufacture and has a tendency to bind. Rather, the pivotal junction is provided by upwardly-extending sides or flange plates integral with each side of both hinge plates, which flanges define internal bores for receiving fasteners, e.g., bolt-nut combinations. In a composite arrangement several of the hinge units may be affixed between a pair of elongate slats to afford a continuous rigid corner with respect to a freight load.

Brief description of the drawings

The drawings disclose an illustrative embodiment of the present invention to indicate the various objects and advantages hereof and set forth as follows:

FIGURE 1 is a perspective view illustrating an application of an apparatus constructed in accordance with the present invention;

FIGURE 2 is an enlarged perspective of a portion of the structure of FIGURE 1;

FIGURE 3 is a sectional view taken along line 3—3 of FIGURE 2; and

FIGURE 4 is a fragmentary sectional view taken along line 4—4 of FIGURE 2.

Description of the preferred embodiment

Referring initially to FIGURE 1, there is shown a semi-trailer 10 bearing a freight load 12 which defines a generally parallelepiped configuration. The load 12 is seated and secured on the trailer 10 by tie lines 14 that are in fixed engagement with anchors 16 (affixed to the trailer 10) and bracing structures 18. In general, the bracing structures 18 embody the invention hereof.

The load 12 is generally indicated to be somewhat laminar with the result that components thereof may slide in relation to one another sufficiently to spill the entire load. Generally, freight in various forms must be considered capable of laminar displacement. However, as may be seen from a consideration of FIGURE 1, as long as the upper corners of the load are defined by the bracing structures 18, the load is forced to remain stable and squarely seated on the trailer 10. The characteristic of the bracing structures 18 to maintain a corner by providing a completely-adequate association with the tie lines 14 will now be considered in association with the detailed description of these structures.

Referring now to FIGURE 2, the basic element of the bracing structure 18 is shown as a hinge 20. That is, referring concurrently to FIGURES 1 and 2, the bracing structures 18 include a plurality of the hinges 20 mounted between a pair of elongate slats 22 and 24. The slats may be made of wood, composition, metal or various other materials; however, as disclosed herein wooden slats are employed. Consequently, the slats 20 and 24, as shown, are affixed to the hinge 20 simply by wood screws 26.

The hinge 20 comprises, as illustrated in FIGURE 2, a horizontal hinge plate 28 and a vertical hinge plate 30. These hinge plates are somewhat elongate, specifically it has been found desirable to provide the entire end-to-end length of the hinge 20 at least three times the measurement of the width thereof. Again, although various materials may be employed steel has been most satisfactory in present embodiments.

The two hinge plates 28 and 30 are generally similar, incorporating line engaging hooks at their outward ends and mating or joining structure at their inner ends. Specifically, the horizontal hinge plate 26 terminates at its outer end in a pair of spaced-apart hooks 32 and 34 defined by integral flat extensions of the hinge plate 28, with a gap 36 therebetween and turned back along a circular path thereby providing an effective structure to receive a rope or line 38 as shown in phantom.

The outer end of the hinge plate 26 is similarly terminated in a pair of flat hooks 40 and 42 separated by a space or gap 44.

The joined, or inner ends of the hinge plates 28 and 30 incorporate transverse (upwardly extending) sections defining bores 46 for receiving a bolt 48 or other fastener affording a pivotal junction. More specifically, the hinge plate 28 extends with the unitary width from (and including) the hooks 32 and 34 to the junction location, at which the hinge plate is turned back externally to develop a cylindrical section 50. The cylindrical section 50 and the hooks 32 and 34 all extend from the upper side of the hinge plate 28. At the sides of the cylindrical section 50 (laterally outward) the section 50 matingly receives abutting face members 52 and 54. The members 52 and 54 lie coincident with the cylindrical interior of the section 50 and may be affixed thereto if desired. Furthermore, the members 52 and 54 define the bores 46.

As indicated above, a similar structure is incorporated in the hinge plate 30, including a cylindrical section 56 and side members 58 and 60. Again, these members define bores 46 for matingly receiving a bolt 48 (FIGURE 4) which in turn receives a nut 62 to afford a swinging or pivotal motion by the two plates of the hinge structure 20.

In addition to the fastener means provided through the bores 46, the flat central portions of the hinge plates 26 and 28 also receive screws 26 through defined bores so as to be joined with the slats 22 and 24. In this regard, it is to be recognized that in some instances, the hinge 20 may be employed alone or in sets without the slats 22 and 24 being affixed thereto.

In manufacture, the hinge 20 may be produced by relatively-unsophisticated equipment which is generally available and economical to operate. Specifically, for example, each of the hinge plates 28 and 30 may be stamped from sheet steel using a similar die. Thereafter, by various metal-forming techniques, the hooks, cylindrical sections, and side members may be formed. For additional strength, the cylindrical section 50 may be welded to the circular edges of face members 52 and 54 at the abutting corners therebetween. Finally, the separate hinge plates may be bored, finished and joined in pairs by the nut-bolt combination as described.

In using the hinge 20, it will normally be placed at the corner of a load 12 (FIGURE 3) so that the hinge plates 28 and 30 define a right-angle extending parallel to the top and side of the load 12. In this regard, it is to be noted that in that configuration (FIGURE 3) by reason of the pivot mount provided by the bolt 48 and the mating surfaces of the cylindrical sections at the junction 64, the hinge may not be reduced to define a lesser angle. This criterion establishes certain stability in maintaining a freight load in its proper configuration.

With the hinges 20 positioned at the corners of a freight load (either independently or ganged to a pair of slats), lines 14 are employed to form a network over the load which maintains the hinges in position as well as tying the load to the trailer 10 (FIGURE 1). In this regard, the hinge structure hereof accommodates a wide variety of different ties with the lines 14. Specifically, the lines may pass over one or both of the hooks 32 and 34 (FIGURE 2). The lines may pass through the cylindrical sections as section 50 (FIGURE 3). The lines may pass over the top of the cylindrical sections 50 and 56, encountering no sharp corners (FIGURE 2) and if slats are employed the lines may pass under the hinge 20 (FIGURE 2). The flexibility provided in this regard is a considerable advantage in using the structure hereof.

In another regard, the bolt 48, which normally receives a nut 62, may be conveniently and easily removed from the bores 46 to remove the load-supporting structure. In this regard, no difficulty arises as with binding rod hinges and additionally should one of the hinge plates become bent or damaged, the other may be preserved for reuse in cooperation with still another plate.

From the above, it may be seen that the structure hereof affords several distinct advantages both in manufacture and use. Specifically, the structure may be easily and inexpensively manufactured. Furthermore, the structure is economical to manufacture and rugged in use. Still further, the structure affords a wide variety of anchors or ties for tie lines thereby affording considerable flexibility in use. Still further, the structure tends to be somewhat rigid in use affording the advantage of greater load stability. Of course, additional and other advantages hereof will become apparent to one skilled in the art. In a similar manner, various other embodiments incorporating the features hereof will also become apparent to one skilled in the art. As a result the scope hereof is not to be interpreted in accordance with the above description, but rather, shall be interpreted in accordance with the claims as set forth below.

What is claimed is:

1. A load-bracing hinge structure for affording a corner to a load, as in transient, and for engagingly receciving tie lines, comprising:

first and second hinge plates, each including an integral hook section at one end thereof for receiving said tie lines; and means for pivotally connecting said first and said second hinge plates at the other ends thereof, whereby said hinge structure defines at least one transverse detent to receive one of said tie lines extending substantially perpendicular to the pivotal axis of said connected plates.

2. A hinge structure according to claim 1 wherein said one end of each of said hinge plates defined two spaced-apart hook members separated to define a said transverse detent therebetween.

3. An elongate hinge structure for bracing loads, comprising:

a first elongate slat;
   a second elongate slat;
   a plurality of hinge structures as defined in claim 2;
   means affixing said first slat to one hinge plate of each of said hinge structures; and means affixing said second slat to the other hinge plate of each of said hinge structures.

4. A structure in accordance with claim 3 wherein said hinge structure includes integral side members extending transversely from each of said hinge plates contiguous said other ends and fastener means for facingly engaging side members of each of said plates.

5. A hinge structure according to claim 1 wherein said means for pivotally connecting said first and said second hinge plates includes integral side members extending transversely from each of said hinge plates contiguous said other ends and fastener means for facingly engaging side members of each of said plates.

6. A hinge structure according to claim 5 wherein said other end of at least one of said hinge plates is turned back to provide an exterior rounded surface between said side members for receivingly engaging said tie lines.

7. A hinge structure according to claim 6 wherein an internal rounded surface is defined by said one end of said hinge plate and wherein said internal rounded surface defined an internal transverse channel for receiving one of said tie lines.

8. A hinge structure according to claim 7 wherein said fastener means comprise a plurality of bolt and nut combinations.

References Cited

UNITED STATES PATENTS

| 518,207 | 4/1894 | Cassaday et al. | 280—179.1 |
| 1,095,679 | 5/1914 | Shave et al. | 280—179.1 |
| 2,772,064 | 11/1956 | Cole | 280—179.1 XR |
| 3,154,026 | 10/1964 | Klasing | 105—369 |

DONALD A. GRIFFIN, *Primary Examiner.*